UNITED STATES PATENT OFFICE.

JOHN T. MALCOLM, OF SEATTLE, WASHINGTON.

COMPOSITION OF MATTER TO BE USED AS A BEVERAGE, AND ESPECIALLY AS A SUBSTITUTE FOR COFFEE.

1,119,849.

Specification of Letters Patent. Patented Dec. 8, 1914.

No Drawing. Application filed June 23, 1914. Serial No. 846,746.

*To all whom it may concern:*

Be it known that I, JOHN T. MALCOLM, a citizen of the United States, and a resident of the city of Seattle, in the county of King and State of Washington, have invented a new and useful Composition of Matter to be Used as a Beverage, and Especially as a Substitute for Coffee.

My composition consists of the following ingredients combined in the proportions stated, viz.:

| | |
|---|---|
| Sweet potatoes | Twenty-five per cent. |
| Rice | Twenty-five per cent. |
| Wheat grains | Twenty-five per cent. |
| Coffee beans | Twenty-five per cent. |

These ingredients are roasted separately and then ground together in about the same manner, and to the same degree of fineness, as ordinary coffee. To prepare the beverage about one tablespoonful of this composition, ground as indicated, is used for each teacupful of the completed beverage, although the strength of the beverage may be varied by using a greater or less quantity of the ground composition in the same manner as ordinary coffee is varied. After determining about the number of cups of the finished beverage to be produced, a corresponding quantity of the ground mixture is placed in an ordinary coffee pot and cold water equal to about one and one-third the bulk of the finished beverage is poured over the mixture and the whole allowed to boil for several minutes, when the beverage will be ready to serve. I prefer to serve the finished beverage with sugar and cream, in the same manner as ordinary coffee, but it will be understood that this may be changed according to the taste of the drinker.

This beverage is hardly distinguishable from good coffee and, obviously, contains more nutriment and has a less deleterious effect upon the human system, and for that reason is highly desirable as a coffee substitute.

Having described my invention, what I claim as new and desire to protect by Letters Patent is—

A coffee substitute, consisting of ground and roasted rice twenty-five per cent., ground and roasted sweet potatoes twenty-five per cent., ground and roasted wheat grains twenty-five per cent. and ground and roasted coffee beans twenty-five per cent., combined and boiled together with water, substantially as described.

JOHN T. MALCOLM.

Witnesses:
FRED B. GORIN,
EMMA KROGER.